United States Patent [19]

Holm

[11] Patent Number: 4,843,876

[45] Date of Patent: Jul. 4, 1989

[54] LIQUID LEVEL INDICATOR

[75] Inventor: Lauri J. Holm, Lidingö, Sweden

[73] Assignee: Systemteknik AB, Lidingo, Sweden

[21] Appl. No.: 86,068

[22] Filed: Aug. 17, 1987

Related U.S. Application Data

[63] Continuation-in-part of Ser. No. 836,856, Mar. 6, 1986, abandoned.

[30] Foreign Application Priority Data

Mar. 6, 1985 [SE] Sweden ................................ 8501075

[51] Int. Cl.$^4$ ........................ G01F 23/30; G01F 23/76
[52] U.S. Cl. ................................... 73/309; 73/290 R; 73/322.5
[58] Field of Search ................. 73/296, 309, 311, 312, 73/314, 319, 322.5, 433, 448, 450, 447, 290 R; 116/DIG. 32; 177/207; 364/509

[56] References Cited

U.S. PATENT DOCUMENTS 4,244,218  1/1981  Wohrl .................................. 73/309

FOREIGN PATENT DOCUMENTS

| 1276919 | 3/1960 | Fed. Rep. of Germany ........ 73/296 |
| 9164 | 9/1908 | France ................................. 137/452 |
| 0630754 | 12/1927 | France ................................. 73/309 |
| 0010417 | 1/1982 | Japan ................................. 73/290 R |
| 57-42815 | 3/1982 | Japan ................................. 73/309 |
| 0156775 | 10/1956 | Sweden ................................. 73/309 |

Primary Examiner—William A. Cuchlinski, Jr.
Assistant Examiner—Morris Worth
Attorney, Agent, or Firm—Merchant, Gould, Smith, Edell, Welter & Schmidt

[57] ABSTRACT

A liquid level indicator comprises an elongate member extending vertically through a liquid container, the weight of the member being sensed as a measure of the liquid level in the container. At least at one predetermined point of its length, the member is formed with a transverse portion having a lower surface extending substantially horizontally. Furthermore, the member is tubular, and the transverse portion is located within the tube but does not occupy the entire internal cross-sectional area thereof. To determine the absolute position of the liquid level, the indicator utilizes an instantaneous change of weight provided by the liquid.

9 Claims, 5 Drawing Sheets

LIQUID LEVEL INDICATOR

This application is a continuation-in-part of application Ser. No. 836,856 filed on Mar. 6, 1986 now abandoned.

BACKGROUND OF THE INVENTION

The present invention relates to liquid level indicators in general and more precisely to those comprising an elongate member which extends vertically through a liquid container and, at least at one predetermined point of its length, is formed with a transverse portion, the weight of the member being sensed as a measure of the liquid level in the container.

Level indicators of this type are reliable but are dependent on the liquid density, and therefore a change in density will affect the indication. To be able to pay regard to changes in density, standardisation, i.e., direct or indirect determination of the liquid density is required. Indirect determination of the liquid density may be carried out for example by determining the liquid level by some other means and relating it to the liquid level established through the above-mentioned sensing of the weight. By arranging a transverse portion on the member, a change in the magnitude of the weight change per unit of time is obtainable at the beginning of the transverse portion, but this requires a relatively quick change of the liquid level.

SUMMARY OF THE INVENTION

One object of the present invention is to provide a liquid level indicator of the above-mentioned type in order to determine in a simple and accurate manner one or more reference levels, whereby indirect determination of the liquid density is effected. Another object is to provide a liquid level indicator by which accurate reference level determination is made possible even at very slow liquid level changes.

According to the invention, these objects are achieved in that the said liquid level indicator is characterized in that the member is tubular, that the transverse portion is located within the tube, and that the transverse portion has a lower surface extending horizontally in order to provide, by utilizing the surface tension of the liquid, an instantaneous change of weight which is opposite to the change of weight resulting from the preceding change of the liquid level and which determines the absolute position of the liquid level.

BRIEF DESCRIPTION OF THE DRAWINGS

The invention will be described in more detail below, reference being had to the accompanying drawings in which.

DESCRIPTION OF THE PREFERRED EMBODIMENT

Figure 1:
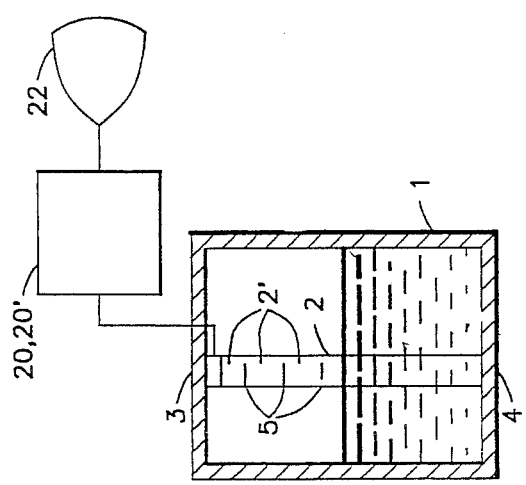
FIG. 1 shows schematically the location of a liquid level indicator according to the invention in a liquid container.

A liquid container 1 as shown in FIG. 1 comprises an elongate sensing member 2 vertically positioned such that it extends substantially over the entire depth of the container 1. The sensing member 2 is fixedly positioned in the container 1, for example in that it is suspended from a weight-sensing means 3 mounted in the upper part of the container or rests on such a weight-sensing means 4 mounted at the bottom of the container.

If the sensing member 2 has a constant cross-sectional area, the weight sensed by the means 3 or 4 will vary as a linear function of the liquid level. According to the invention, the sensing member 2 is a tube so that the liquid level therein will not be disturbed by, for instance, wave formation outside the tube, while at the same time following the liquid level in the container as a whole. As shown in FIG. 1, there is a vent toward the bottom of tubular member 2 to admit liquid therein, and an air vent toward the top of tubular member 2.

Figure 3:
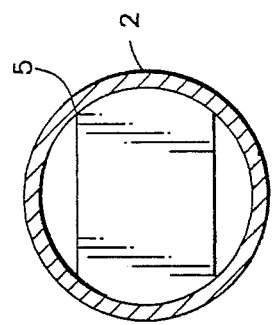
FIG. 3 is a cross-section of the sensing member in FIG. 2.
Figure 2:
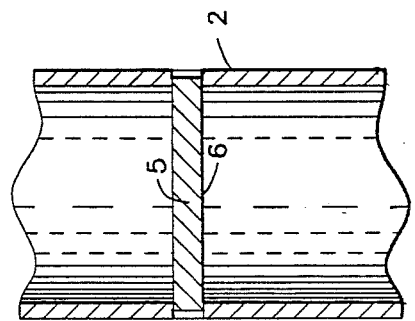
FIG. 2 is a longitudinal section of a portion of the sensing member of the level indicator.

In predetermined positions within the tube 2, horizontal, rigid plates 5 are mounted, as shown in FIGS. 2 and 3. Plates 5 fixedly connected to the tube 2, each form a transverse portion having a lower surface 6 extending substantially horizontally. The plate 5 is formed such that it does not occupy the entire internal cross-sectional area of the tube, i.e., the liquid may rise or sink past the plate 5.

To make the liquid level indicator of the present invention function, the liquid must be sucked up against the lower surface 6 before the liquid level has fully reached the level of surface 6. Since the surface tension of the liquid is given, a suitable material must be chosen for the surface 6 of the plate 5. More precisely, the material must be such that its adhesion relative to the liquid is greater than the cohesion of the liquid.

As noted above, tubular member 2 is suspended from or rests on weight-sensing means 3 or 4, respectively. While the weight-sensing means could be placed at either location, it will be assumed that the operative weight-sensing means, or "cell", is suspended from the top of tank 1. Cell 3 is preferably of the type that provides an electrical signal indicative of the load on the cell, i.e., the weight of tubular member 2. A standard electronic load cell, for example, can be used.

As shown in FIG. 1, cell 3 is operatively connected to a signal processor 20, 20' which in turn is connected to a display 22. Signal processor 20, 20' takes the signal from cell 3 and calculates the liquid level in tube 2, and therefore in tank 1, using the well-known buoyancy equation:

$$W = W_0 - (LAD(T))$$

wherein W is the weight of the tube 2 as sensed by cell 3; $W_0$ is the weight of the tubular member 2 when tank 1 is empty; L is the liquid level in tank 1; A is the cross-sectional area of tubular member 2; and D(T) is the liquid density as a function of the temperature T. For example, when the liquid level $L_1$ corresponding to the lowest transverse member 5 is reached during filling, there is obtained from the above-mentioned equation a value of D(T) since W and L—$L_1$ are then known, i.e.:

$$D = (W_0 - W)/L_1 \times A$$

This value of D is used until the level $L_2$ is reached, and then D can again be determined, etc.

The levels $L_1$ through $L_4$ (assuming four transverse members 5) are absolute levels since their positions are exactly known (relative to the zero level) while liquid levels between these levels $L_1$ through $L_4$ merely are known relative to the absolute levels in an indirect manner by the buoyancy equation.

More specifically, signal processor 20, 20' (i) calculates the appropriate density value (following an initial period during which an assumed density value is used) when the liquid level reaches each cross member 5; and (ii) uses the calculated (or assumed) density value to determine the relative liquid level in tubular member 2, and hence in tank 1. As further described below, signal processor 20, 20' determines when the liquid level has reached one of the cross members 5, and armed with this information and the corresponding liquid level, and the weight and cross-sectional area of tubular member 2, calculates the density and uses this density value to calculate relative liquid levels until the next cross member 5 is encountered, at which time another and more current calculation of density can be made.

The calculated liquid level is continuously displayed on display device 22 which can be a liquid crystal digital display or a video display terminal (VDT), for example.

Figure 7:
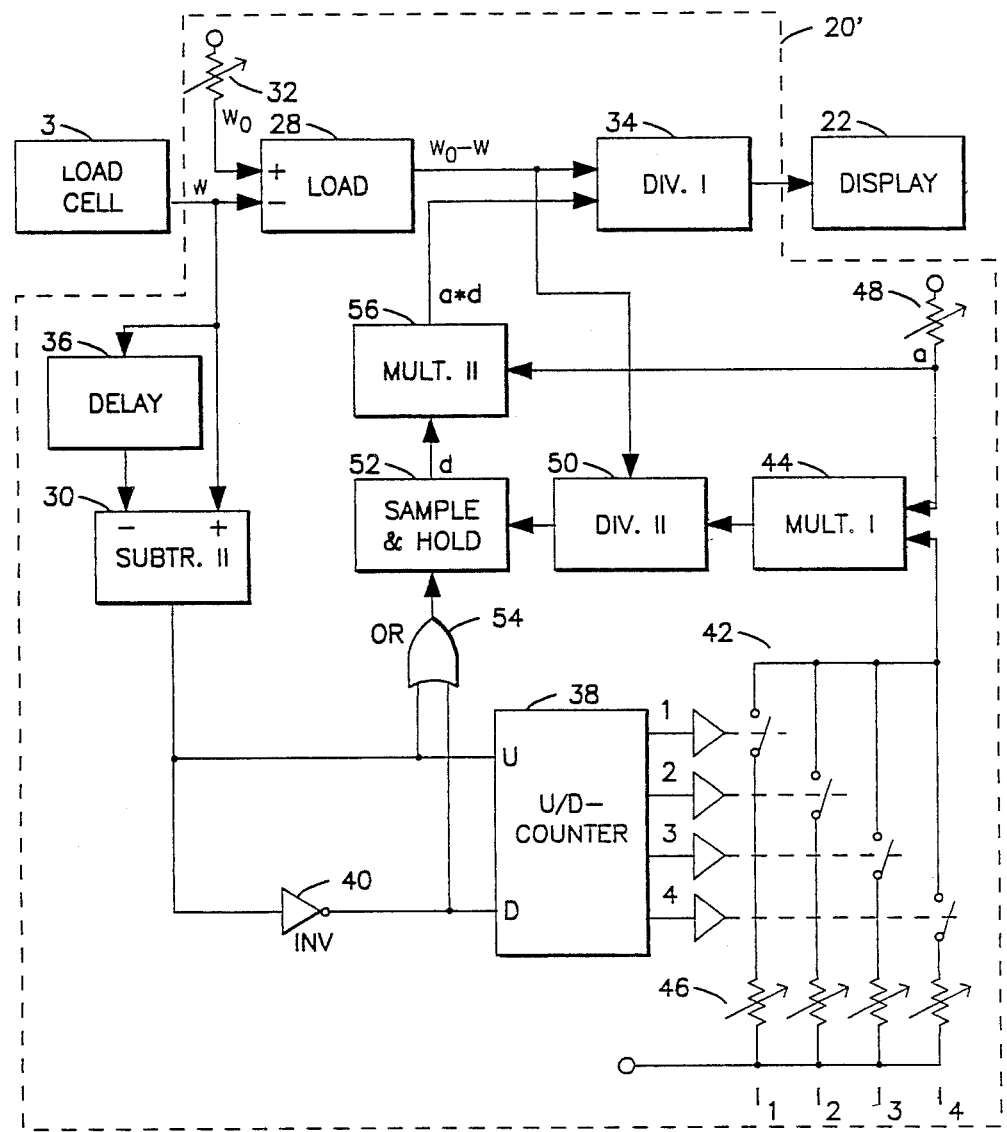
FIG. 7 is a schematic diagram of an analog circuit suitable for use with the liquid level sensor of the present invention.
Figure 6:
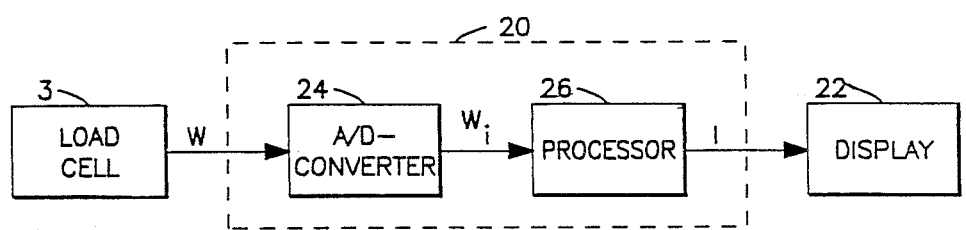
FIG. 6 is a functional diagram of a digital circuit suitable for use with the liquid level sensor of the present invention.

As those skilled in the art will recognize, signal processor 20, 20' can take any one of a large variety of forms. Two possible circuits are shown in FIGS. 6 and 7, the former being a digital microprocessor-based circuit, and the latter being an analog circuit. Each exemplary circuit is described below, starting with the digital circuit of FIG. 6.

Figure 8:
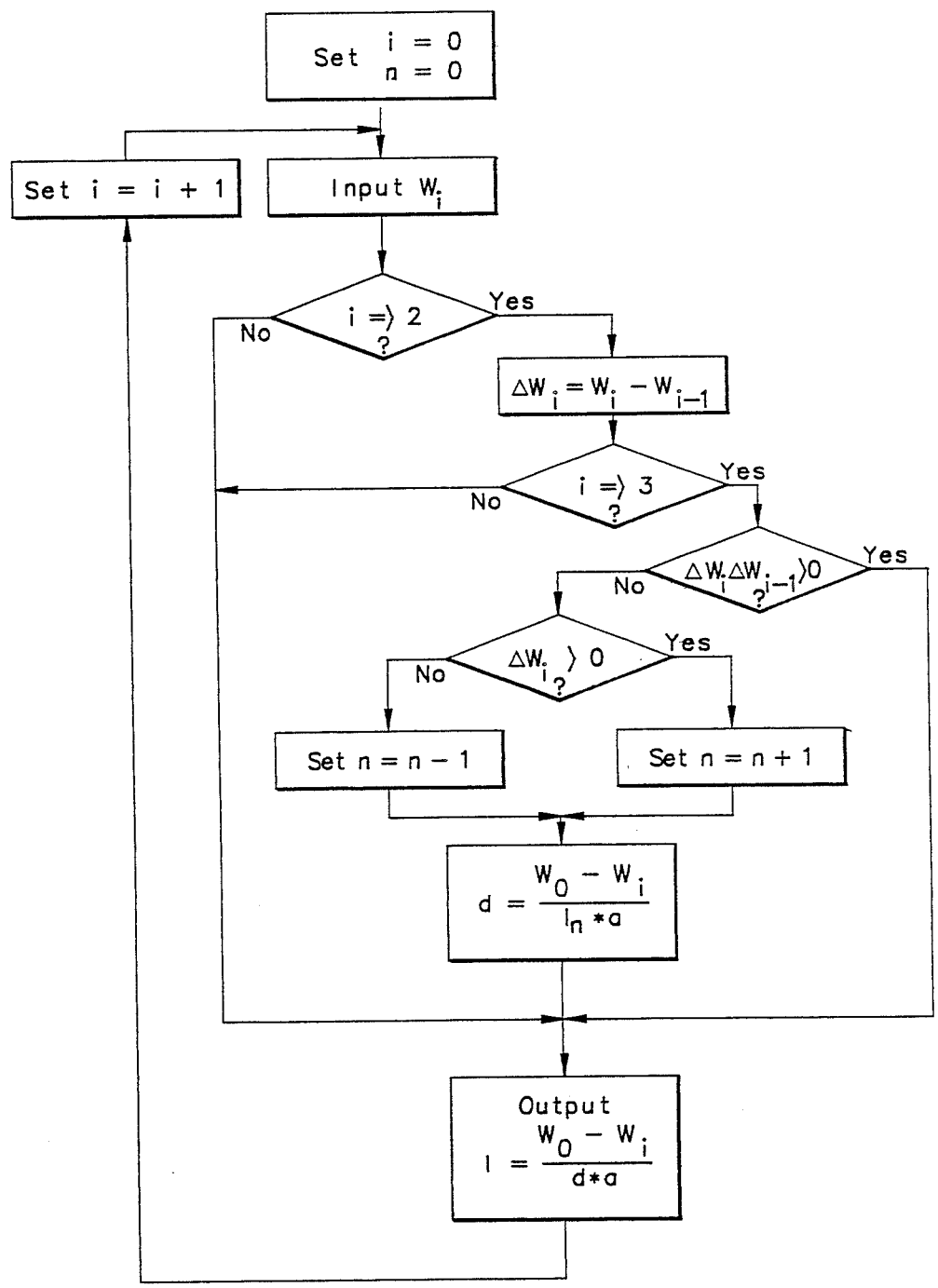
FIG. 8 is a functional flow diagram for the digital circuit of FIG. 6.

FIG. 6 shows a broad functional or schematic diagram of a digital embodiment 20 of the signal processor, connected to load cell 3 and display 22. Basically, digital circuit 20 includes an analog-to-digital converter 24, the input of which is connected to the output of cell 3; and a microcomputer or processor 26 which receives the digital weight signal W from A/D converter 24 and processes it to produce a signal 1 indicative of the liquid level. Those skilled in the art will readily recognize that microcomputer 26 preferably includes power supply, read only memory (ROM), random access memory (RAM), input/output and calculation components or devices, none of which are shown or described herein. Further, although a specific program for processor 26 is not disclosed herein, the functional flow diagram for processor 26 is shown in FIG. 8 and described below. The output signal from processor 26 provides an input to liquid level display 22.

Analog signal processing circuit 20' is shown in FIG. 7. Circuit 20' includes a pair of subtractors 28 and 30, each of which has a pair of inputs and a single output. The negative input terminal of substractor 28 is connected to the output terminal of cell 3 whereas the positive input terminal of subtractor 28 is connected to a potentiometer 32 which is connected to a regulated DC voltage and which provides a predetermined fixed signal indicative of $W_0$, the empty-tank weight of tubular member 2. The output of subtractor 28, representing $W_0$ minuts W, is fed to one of the inputs of a dividing circuit 34, the output of which drive liquid level display 22. Both of the inputs for subtractor 30 derive from load cell 3, but one input (connected to the positive input terminal of subtractor 30) represents the instantaneous weight W, whereas the other input (connected to the negative input terminal) is a time-delayed representation thereof, the delay being provided by a signal delay device 36. The output of subtractor 30 is connected to the "up" trigger of an up/down counter 38; the "down" trigger of counter 38 is provided by inverter 40 which receives as input the output of subtractor 30.

Still referring to FIG. 7, the four outputs of counter 38 (corresponding to four transverse members 5, are connected to and operate a switch bank 42. The output terminals of switches 42 are commonly connected to one input of a multiplier 44, whereas the input terminals of switches 42 are connected to potentiometers 46 which in turn are connected to a fixed voltage supply. The potentiometers 46 and their associated fixed voltage supply combine to provide predetermined voltages indicative of abosolute liquid levels $L_1$ through $L_4$ (corresponding to four cross members 5 within tubular member 2).

The other input to multiplier 44 derives from a potentiometer 48 and a fixed voltage supply which combine to provide a predetermined voltage indicative of the cross-sectional area "A" of tubular member 2. The output multiplier 44 is connected to one input of a dividing circuit 50; the other input for divider 50 is connected to the output of subtractor 28 (representing $W_0$ minus W).

The output of divider 50 is connected to the input of a sample and hold circuit 52 which is triggered or clocked by the output signal from an OR gate 54, the two inputs of which are the normal and inverted outputs of subtractor 30. The output of sample and hold circuit 52 is connected to one input of a multiplier 56; the other input to multiplier 56 is the voltage representing "A", the cross-sectional area of tubular member 2, derived from potentiometer 48. The output of multiplier 56, representing the product of "A" (cross-sectional area) and "D" (density of liquid) is connected to one input of divider 34. As discussed above, the other input terminal of divider 34 is connected to the output of subtractor 28. Thus, the output of divider 34 represents the quantity $W_0$ minus W divided by the quantity "D" times "A". According to the buoyancy equation, as discussed above, this quotient represents the liquid level within tube 2, and in tank 1. The output of divider 34 drives display device 22.

OPERATION

Figure 4:
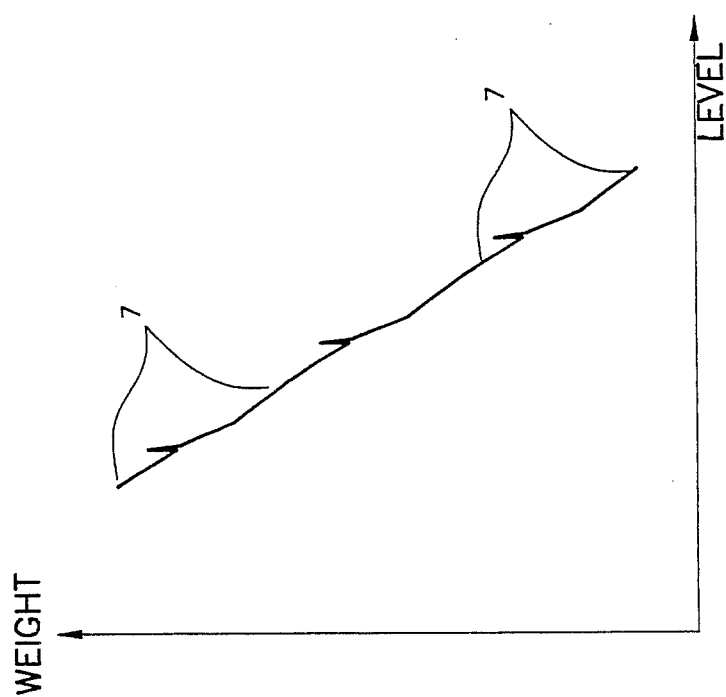
FIG. 4 is a diagram which shows schematically the weight of the sensing member as a function of the liquid level.

As schematically shown in FIG. 4, the weight of the member 2 decreases as the liquid level in the container 1 increases, which is a consequence of the increasing lifting power exerted by the liquid on the member 2. The change of weight and lifting power is linear within the sections 7 of the curve in FIG. 4, said sections 7 corresponding to sections 2' of the member 2, the sections 2' having a constant cross-sectional area and being defined by the plates 5.

Figure 5:
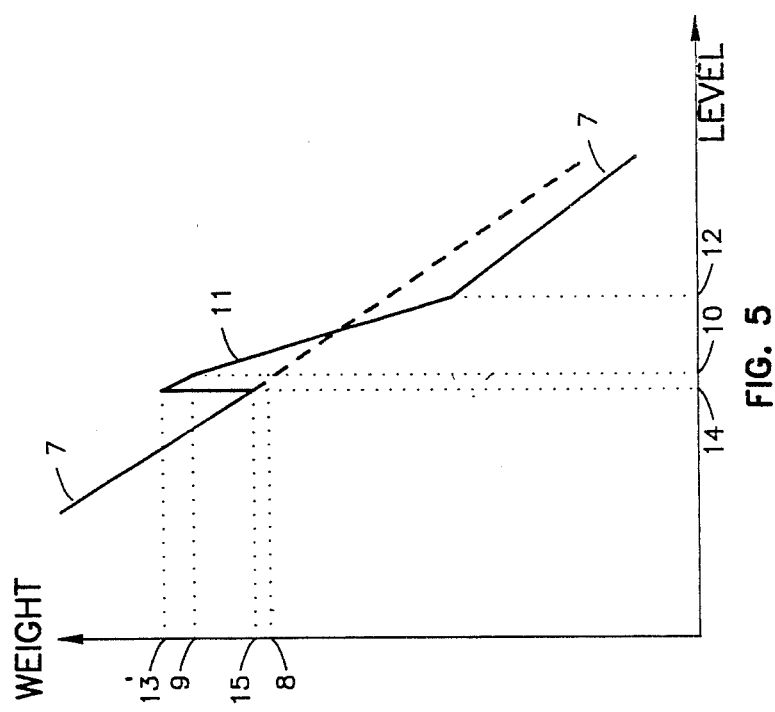
FIG. 5 shows, on a larger scale, a portion of the diagram in FIG. 4.

FIG. 5 shows more closely how the weight of the member 2 changes as the liquid level in the container 1 changes. Thus, when the level rises, the weight first decreases linearly along, for instance, an upper curve of section 7 until the liquid, because of its surface tension, is sucked up against the lower surface 6 of a plate 5. The lifting power now decreases, and consequently the weight increases instantaneously from a value 8 to a value 9 at substantially one and the same level 10.

If the level continues to rise, the weight decrease follows a steeper line section 11 until the upper surface of the plate 5 is passed at a level 12. The greater steepness is due to the fact that the cross-sectional area of the plate 5 and the tube portion on a level therewith is larger than the cross-sectional area of the remaining tube 2.

Above the level 12, the weight decrease follows a lower line section 7 which runs parallel to the upper line section 7 in FIG. 5.

When the level in the container 1 changes in the opposite direction, the weight will follow the lower line section 7 and the steeper section 11 to a weight value 13 which corresponds to a level 14 lower than the level 10, since the surface tension of the liquid can retain the liquid at the lower surface of the plate 5 at a height greater than the one to which the liquid was previously sucked up. When the liquid leaves the lower surface of the plate 5, the weight of the tube 2 decreases instantaneously from the value 13 to a value 15. On further decrease of the level, the weight increases along the upper line section 7.

It will be appreciated that by detecting the transition from the value 8 or 13 to the value 9 or 15, respectively, it will be possible to determine the absolute position of the liquid level or, indirectly, the density of the liquid. The invention thus uses the reversal of signs of the derivative for the curve in FIG. 5, which implies a standardisation of the liquid level indicator, which is very simple and independent of the rate of level change.

If desired, the different line sections 7 may be mutually aligned. This requires that the average value of the cross-sectional area of the sensing member 2' at a portion around each plate 5 equals the constant value of the sensing member between the plates 5.

The operation of the present invention can be further described with specific reference to preferred signal processor circuits 20 and 20'. The operation of each circuit is described below.

DIGITAL CIRCUIT 20

As noted above, FIG. 8 shows a functional flow diagram for the operation of processor 26 of digital circuit 20. Prior to operation of the liquid level sensor, the ROM memory device associated with processor 26 is provided with the value of $W_0$, i.e., the empty-tank weight of tubular member 2; a starting value of D, i.e., the density of the liquid; a value of A, i.e., the cross-sectional area of tubular member 2; and the values of the predetermined levels $L_1$, $L_2$, $L_3$, and $L_4$, i.e., the absolute levels of the transverse portions 5 which, in this case, are assumed to be four.

The operation starts with the container 1 empty, and indices i and n are set to 1 and 0, respectively, as shown in block 60 of FIG. 8. A, D, $W_0$ and $L_1$ through $L_4$ (for example) are also "initialized" at block 60. The next step is to input a tubular member weight value $W_1$, as represented by block 62. Decision diamond 64 inquires whether index i is greater than or equal to 2. If so, enough values of W have been accumulated to calculate a delta W or "$\Delta W$" value, and control switches to the right. If not, as in the case when index i is equal to 1, the program branches to processing block 66 where the liquid level L is calculated using $W_1$ and the initialized values of $W_0$, D and A, using the equation:

$$L = (W_0 - W_1)/(D \cdot A)$$

Of course, at this point display device 22, shown in FIG. 6, can be updated. Once these operations have been accomplished, index i is incremented, as shown in block 68 of FIG. 8, and a new value of W ($W_2$ in this case) is taken from A/D converter 24 shown in FIG. 6. Since i is indeed greater than or equal to 2 when decision diamond 64 is encountered the second time, the program branches to block 70 to calculate a delta W value (e.g., $\Delta W_2 = W_2 - W_1$). $\Delta W_i$ is stored and index i is again compared to a constant, namely 3, in decision diamond 72. Since i is equal to 2 the first time diamond 72 is encountered, i is not greater than or equal to 3, and the program immediately branches to calculation block 66 where L is again calculated. Decision diamond 72 branches to the right only after two delta W values are available, as further described below.

Following the calculation of L at block 66, index i is incremented to 3 at block 68, and $W_3$ is input at block 62. Since 3 is greater than 2, the program branches to block 70 through decision diamond 64. There, $\Delta W_3$, the difference between $W_3$ and $W_2$, is calculated. $\Delta W_3$ is stored and, since i is now equal to 3, the program branches to the right at decision diamond 72 to another decision diamond 74, where the product $\Delta W_i \cdot \Delta W_{i-1}$ is compared to zero. Thus, the first time through, the product $\Delta W_3 \cdot \Delta W_2$ is compared to zero, and if it is greater than zero, the program immediately proceeds to block 66 for calculation of L. If $\Delta W_3 \cdot \Delta W_2$ is in fact positive, this means that there has not been a sudden change from a decreasing trend in W to an increasing trend in W, as would occur when the liquid level reaches a transverse portion 5 during filling of container 1; or from an increasing W to a decreasing W, which would occur when the liquid level coincides to a transverse portion 5 during emptying of container 1. Put simply, if $\Delta W_3 \cdot \Delta W_2$ is positive, then the absolute level of L is unknown, and D cannot be accurately recalculated, so the old (or initial) value of D is used, at block 66.

Following the recalculation of L using $W_3$ at block 66, index i is again incremented at block 68 and the process starts anew. Eventually $\Delta W_i \cdot \Delta W_{i-1}$ will be negative (when the liquid level reaches one of the transverse portions 5), as tested at decision diamond 74, at which time the program will branch to still another decision diamond 76, which inquires whether $\Delta W_i$ is positive. If so, index n is incremented; if not, index n is decremented. Index n is used simply to select the proper value of L from the computer's memory. If $\Delta W_i$ is positive, this means that the sensed weight of tubular member 2 has suddenly increased, as in the case when container 1 is filling. Thus, for example, when container 1 is being initially filled, and the lowest transverse portion 5 is reached, $\Delta W_i$ will be positive, and n will be incremented from zero to 1, so that L will be made equal to $L_1$. That is, these operations tell the computer that it should now use the "absolute level" $L_1$ for its calculation of D, described further below. When the liquid level is dropping, it will be necessary to decrement n to select the appropriate "absolute level" $L_n$. The "increment n" block is designated with reference numeral 78 whereas the "decrement n" block is designated with reference numeral 80.

Once the appropriate $L_n$ value is determined, the density D is calculate at block 82 according to the equation:

$$D=(W_0-W_i)/(L_n \cdot A)$$

It should be noted that this is an "indirect" determination of D, based on the known liquid level and the measured tubular member weight. This recalculated, more accurate, value of D is used to calculate L, as per block 66. The process continues in this manner, D being recalculated every time the liquid level coincides with one of the transverse portions 5.

Level $L_1$ is used to calculate D until such time as the second cross member 5 is reached, and so on. If at any time the level is dropping and a transverse member 5 is encountered, $\Delta W_i$ will be negative and the index n will be decremented to select the appropriate absolute level $L_n$ to calculate the new value of D.

ANALOG CIRCUIT 20'

It is assumed that operation starts with container 1 empty. When the liquid level monitoring system is activated and the level within container 1 lies above or below levels $L_1$, $L_2$, $L_3$, and $L_4$, its value is produced by means of subtractor 28 and divider 34 according to the well-known buoyancy equation. At the start, this presupposes that the sample and hold circuit 52 stores a starting value for D. This also presupposes that the value of $W_0$ and A are set by means of potentiometers 32 and 48, respectively. Similarly, the values corresponding to liquid levels $L_1$ through $L_4$ are set using potentiometer bank 46. In the starting state, i.e., when container 1 is empty, up/down counter 38 does not drive any of the switches 42. In this case, multiplier 44 and divider 50 do not combine to calculate a value of D and instead the preselected initial value of D is used to calculate the liquid level in container 1.

When any of levels $L_1$ through $L_4$ is passed, subtractor 30 will provide a pulse which indexes the up-/down counter 38 up or down depending on the sign or direction of the pulse. If the output of counter 38 is assumed to be zero at the start and it receives a pulse on its "U" input when the absolute liquid level equals $L_1$, the output "1" of counter 38 will be in its high state, and switch bank 42 and potentiometer bank 46 will combine to provide a voltage corresponding to liquid level $L_1$. Multiplier 44 multiplies this voltage times the voltage corresponding to the cross-sectional area of tubular member 2, i.e., "A". The product is provided to divider 50 which, on its output, supplies the actual value of density D. This value is stored in the sample and hold circuit 52 by means of the pulse provided by OR gate 54. The sample and hold circuit 52 retains the sampled value of D until the next transverse position 5 is passed, at which time a new value of D is calculated.

REVERSAL OF SIGN OF DERIVATIVE

Figure 9:
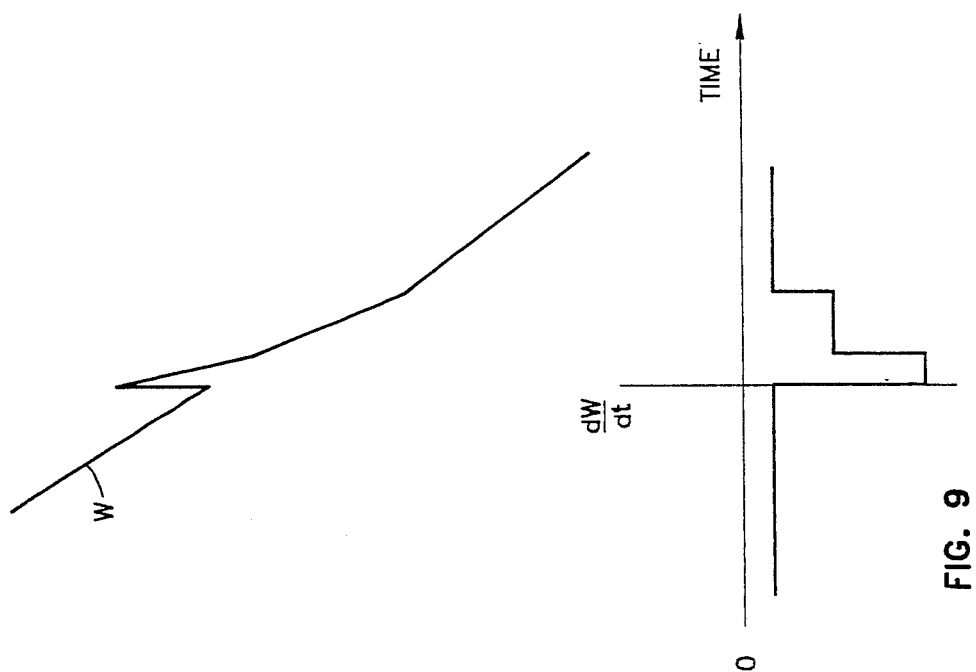
FIG. 9 is a sketch of the signal from the load cell of a preferred liquid level sensor, and the time derivative thereof.

In connection with both signal processing circuits 20, 20', the event which triggers a new calculation of d is the reversal of sign of the time derivative of the weight of the tubular member 2, as measured by load cell 3. That is, referring to FIG. 9, when container 1 is filling the weight of tubular member 2 steadily decreases, as shown in the upper sketch of FIG. 9. However, when a transverse member 5 is encountered, the surface tension of the liquid causes a sudden adherence of the liquid to the bottom surface 6 of transverse portion 5. This causes a relatively sudden increase in the weight of tubular member 2, which in turn causes a "spike" in the signal provided by load cell 3. The sudden change in weight, or more specifically, the sudden change in decreasing to increasing weight, causes a very sudden change in dW/dt, the time derivative of the weight of tubular member 2. This phenomenon is shown in the lower sketch of FIG. 9. Circuits 20, 20' capitalize on this very sudden change in dW/dt by using this easily detected event to trigger the calculation of a new density value.

Figure 10:
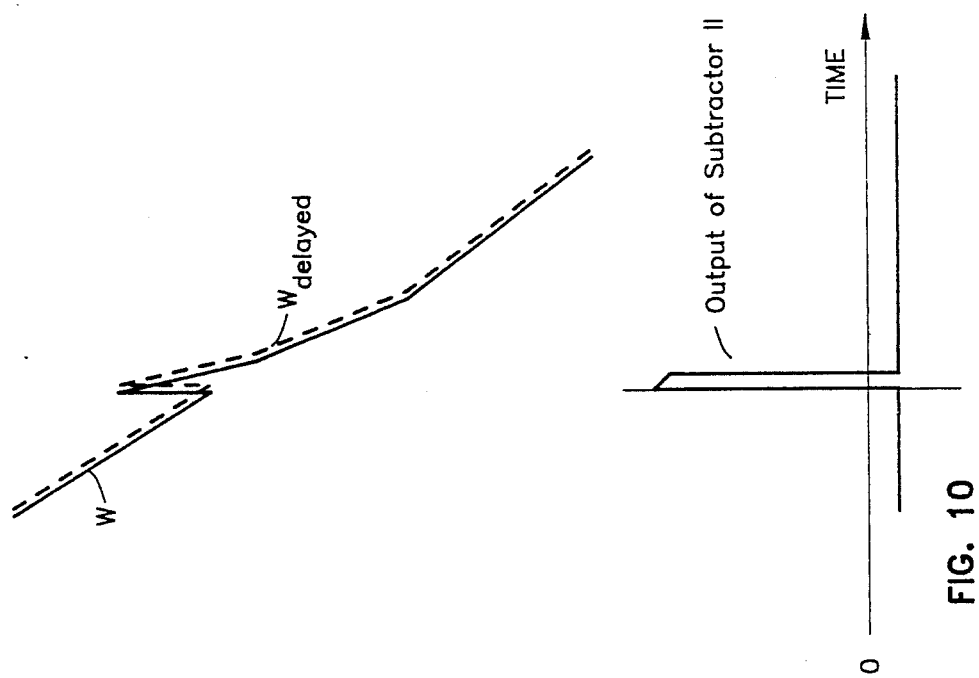
FIG. 10 includes an enlarged sketch of the load cell signal, and a time-delayed version thereof, used to calculate the time derivative of the load cell signal shown in the lower sketch.

With reference to analog circuit 20', subtractor 30 in effect continuously calculates dW/dt by subtracting the time delayed weight from the instantaneous weight. When the output of subtractor 30 "spikes" as shown in the lower portion of FIG. 10, the up/down counter 38 is incremented or decremented, depending on the direction of the spike. This causes a new value of L to be chosen and a new value for the fluid density, D, to be calculated, sampled, and held for subsequent calculations of the liquid level. This value of D is used until another transverse member 5 is reached, at which time a new value of D is calculated.

With reference to the digital circuit 26 and its flow diagram shown in FIG. 8, the reversal of signs in dW/dt is also detected and used to trigger a recalculation of D. As shown in the flow diagram of FIG. 8, when the product $\Delta W_i \cdot \Delta W_{i-1}$ is less than zero, index n is decremented or incremented, as needed, and a new value of density D is calculated.

The above embodiment of the liquid level indicator according to the present invention is the one which is presently preferred, but it may of course be modified within the scope of the invention as defined in the appended claims.

What is claimed is:

1. A tubular member for use in a liquid level indicator, wherein the tubular member is configured to be substantially vertically positioned within a liquid container and connected to a weight sensing device which in turn is connected to a weight analyzing device which in turn is connected to a liquid level output means, wherein the weight analyzing device can calculate the liquid level L in the container based on the sensed weight of the tubular member using the relationship:

$$L=(W_0-W_i)/(D \cdot A)$$

wherein
  $W_0$=empty weight of tubular member
  $W_i$=sensed weight of tubular member, depending on buoyant force
  D=density of the liquid
  A=cross sectional area of tubular member
wherein the tubular member comprises:
  (a) an elongate tubular body having a top end and a bottom end, wherein an opening is formed toward the bottom end thereof whereby the liquid level within the tubular body reflects the liquid level in the container as a whole; and
  (b) a transverse portion connected to the tubular body having a lower surface extending horizontally and a known vertical position $L_n$ within the container, wherein when the liquid level L within the container and tubular body coincides with the lower surface of the transverse portion the surface tension of the liquid causes a nearly instantaneous change in the sense weight of the tubular member, which triggers the analyzing device to indirectly calculate the density D of the liquid using the relationship:

$$D=(W_0-W_i)/(L_n \cdot A)$$

whereby the calculated value of liquid density D can be henceforth used to determine the liquid level L as a function of the sensed weight $W_i$ of the tubular member.

2. A liquid level indicator for measuring the level L of a liquid within a container, the indicator comprising:
 (a) an elongated tubular member extending vertically through the liquid container and substantially fixed in relation thereto, wherein the interior of the tubular member is in fluid communication with the liquid container, whereby the liquid level in the tubular member follows the liquid level in the container as a whole;
 (b) means for sensing and analyzing the weight of the tubular member, wherein the liquid level L within the container can be calculated based on the sensed weight of the tubular member using the relationship:

$$L=(W_0-W_i)/(D \cdot A)$$

wherein
 $W_0$=empty weight of tubular member
 $W_i$=sensed weight of tubular member, depending on buoyant force
 D=density of the liquid
 A=across sectional area of tubular member;
 (c) a transverse portion located within the tubular member at a predetermined point $L_n$ of its length, the transverse portion having a lower surface extending horizontally, wherein when the liquid level L within the container and tubular member coincides with the lower surface of the transverse portion the surface tension of the liquid causes a nearly instantaneous change in the sensed weight of the tubular member, which triggers the weight sensing and analyzing means is indirectly calculate the density D of the liquid using the relationship:

$$D=(W_0-W_i)/(L_n \cdot A)$$

whereby the calculated value of liquid density D can be henceforth used to determine the liquid level L as a function of the sensed weight $W_i$ of the tubular member; and
 (d) means connected to the weight sensing and analyzing means for outputting the liquid level L.

3. A liquid level indicator for measuring the level L of a liquid within a liquid container, the indicator comprising:
 (a) an elongate tubular member extending vertically through the liquid container and substantially fixed in relation thereto, wherein the interior of the tubular member is in fluid communication with the liquid container, whereby the liquid level in the tubular member follows the liquid level in the container as a whole;
 (b) means for sensing and analyzing the weight of the tubular member, wherein the liquid level L within the container can be calculated based on the sensed weight of the tubular member using the relationship:

$$L=(W_0-W_i)/(D \cdot A)$$

wherein
 $W_0$=empty weight of tubular member
 $W_i$=sensed weight of tubular member, depending on buoyant force
 D=density of the liquid
 A=cross sectional area of tubular member;
 (c) a transverse portion located within the tubular member at a predetermined point $L_n$ of its length, the transverse portion having a lower surface extending horizontally, wherein changes in the liquid level L and changes in the sensed weight of the tubular member normally bear an inverse relationship, but when the liquid level L is proximate the lower surface of the transverse portion adhesion of the liquid to the lower surface causes a change of the liquid level to result in a nearly instantaneous change in the sensed weight of the tubular member in direct fashion, which triggers and sensing and analyzing means to calculate the density D of the liquid using the relationship:

$$D=(W_0-W_i)/(L_n \cdot A)$$

whereby the calculated value of liquid density D can be henceforth used to determine the liquid level L as a function of the sensed weight $W_i$ of the tubular member; and
 (d) means connected to the weight sensing and analyzing means for outputting the liquid level L.

4. A liquid level indicator for measuring the level L of a liquid within a container, the indicator comprising:
 (a) an elongated tubular member extending vertically through said liquid container and substantially fixed in relation thereto, wherein the interior of the tubular member is in fluid communication with the liquid container, whereby the liquid level L in the tubular member follows the liquid level L in the container as a whole;
 (b) means for sensing the weight $W_i$ of the tubular member as determined by the empty weight $W_0$ of the tubular member less the buoyant force imparted by the liquid on the tubular member;
 (c) a plurality of transverse portions within the tubular member, each located at a predetermined point $L_n$ in its length, and each such transverse portion having a lower surface extending horizontally, whereby when the liquid level coincides with the lower surface of one of the transverse portions adhesion of the liquid to the lower surface caused by surface tension of the liquid results in a direct and nearly instantaneous change in the sensed weight $W_i$ of the tubular member;
 (d) means operatively related to the weight sensing means for calculating the liquid level L according to the relationship:

$$L=(W_0-W_i)/(D \cdot A)$$

wherein
 D=density of the liquid
 A=effective cross sectional area of tubular member;

(e) means operatively related to the calculating means for detecting the direct and nearly instantaneous change of tubular member sensed weight which occurs when the liquid level L coincides with one of the transverse portions;

(f) means responsive to the detecting means for calculating the liquid density D when the direct and nearly instantaneous change of tubular member sensed weight is detected, according to the relationship:

$$D = (W_0 - W_i)/(L_n \cdot A)$$

wherein henceforth the liquid level can be calculated with greater accuracy; and (g) means connected to the calculating means for outputting the liquid level L.

5. A liquid level indicator as claimed in claim 1, wherein the weight sensing device comprises a load cell.

6. A liquid level indicator as claimed in claim 3, wherein the sensing and analyzing means comprises a load cell operatively coupled to an analog circuit configured to:

(a) calculate the liquid level L based on the sensed weight of the tubular member;

(b) detect the nearly instantaneous change in the sensed weight of the tubular member which occurs when the liquid level coincides with the lower surface of the transverse portion; and (c) indirectly calculate the density D of the liquid upon the detection of the nearly instantaneous change in tubular member weight.

7. A liquid level indicator as claimed in claim 3, wherein the sensing and analyzing means comprises a load cell operatively connected to an analog-to-digital converter which in turn is connected to a digital computer, wherein the computer is programmed to respond to the signal produced by the analog-to-digital converter by:

(a) calculating the liquid level L based on the sensed weight of the tubular member;

(b) detecting the nearly instantaneous change in the sensed weight of the tubular member which occurs when the liquid level coincides with the lower surface of the transverse portion; and (c) indirectly calculating the density D of the liquid upon the detection of the nearly instantaneous change in tubular member weight.

8. A liquid level indicator as claimed in claim 4, wherein the transverse portions do not occupy the entire internal cross-sectional area of the tubular member.

9. A liquid level indicator as claimed in claim 8, wherein the transverse portions are horizontal, rigid plates fixedly connected to the tubular member.

* * * * *

UNITED STATES PATENT AND TRADEMARK OFFICE
CERTIFICATE OF CORRECTION

PATENT NO. : 4,843,876
DATED : July 4, 1989
INVENTOR(S) : Lauri J. Holm

It is certified that error appears in the above-identified patent and that said Letters Patent is hereby corrected as shown below:

Col. 3, line 11
"$D = (W_O-W)/L_1xA)$ should be --$D = (W_O-W/(L_1xA)$

Col. 4, line 20
"5" should be --5)--

Col. 4, line 28
"abosolute" should be --absolute--

Col. 7, line 63
"d" should be --D--

Col. 9, line 3
"sense" should be --sensed--

Col. 9, line 35
"across" should be --cross--

Col. 9, line 45
"is" should be --to--

Signed and Sealed this

Fifth Day of June, 1990

*Attest:*

HARRY F. MANBECK, JR.

*Attesting Officer*     *Commissioner of Patents and Trademarks*